(12) United States Patent
Naskali et al.

(10) Patent No.: US 9,620,975 B2
(45) Date of Patent: Apr. 11, 2017

(54) METHODS AND APPARATUS FOR BATTERY CHARACTERISTIC CONVERSION

(71) Applicant: Nokia Technologies Oy, Espoo (FI)

(72) Inventors: Matti Juhani Naskali, Tokyo (JP); Heikki Sakari Paananen, Saku (JP)

(73) Assignee: Nokia Technologies Oy, Espoo (FI)

( * ) Notice: Subject to any disclaimer, the term of this patent is extended or adjusted under 35 U.S.C. 154(b) by 393 days.

(21) Appl. No.: 14/158,988

(22) Filed: Jan. 20, 2014

(65) Prior Publication Data

US 2015/0207354 A1 Jul. 23, 2015

(51) Int. Cl.
| | |
|---|---|
| *H02J 7/00* | (2006.01) |
| *H02M 3/158* | (2006.01) |
| *H02J 7/02* | (2016.01) |
| *H01M 10/42* | (2006.01) |

(52) U.S. Cl.
CPC ........... *H02J 7/0054* (2013.01); *H02J 7/0011* (2013.01); *H02J 7/022* (2013.01); *H02M 3/1582* (2013.01); *H01M 10/4257* (2013.01)

(58) Field of Classification Search
CPC .................................................... H02J 7/0054
USPC ........................................................ 320/103
See application file for complete search history.

(56) References Cited

U.S. PATENT DOCUMENTS

| | | |
|---|---|---|
| 5,945,806 A | 8/1999 | Faulk |
| 7,414,381 B2 | 8/2008 | Popescu-Stanesti et al. |
| 2008/0197801 A1* | 8/2008 | Manor .................. H02J 7/0054 320/103 |
| 2008/0238372 A1 | 10/2008 | Cintra et al. |
| 2015/0003115 A1* | 1/2015 | Barron .................... H02M 1/08 363/17 |

FOREIGN PATENT DOCUMENTS

| | | |
|---|---|---|
| CN | 102647011 A | 8/2012 |
| TW | 201320574 A | 5/2013 |
| WO | 99/52167 A1 | 10/1999 |

OTHER PUBLICATIONS

U.S. Appl. No. 13/722,137, "Balancing of Battery Cells Connected in Parallel", filed on Dec. 20, 2012, 23 pages.
Paananen, "Virtual Battery", Prestudy, Version 0.1, Document ID: DS-26-01-01, Nov. 9, 2013, pp. 1-14.

(Continued)

*Primary Examiner* — Thuan Do
(74) *Attorney, Agent, or Firm* — Mintz Levin Cohn Ferris Glovsky and Popeo, P.C.

(57) ABSTRACT

A battery characteristic converter comprises an interface to a battery and to an electronic device to be powered with energy supplied by the battery. The interface to the battery and the interface to the electronic device are connected using a bidirectional voltage ratio converter. The bidirectional voltage ratio converter is controlled so that the characteristics at the interface to the electronic device are adapted to the electronic device, independently of the battery characteristics. Energy may flow to the electronic device to power the electronic device or from the electronic device to the battery to charge the battery, depending on a comparison of the characteristics at the interfaces.

15 Claims, 10 Drawing Sheets

(56) References Cited

OTHER PUBLICATIONS

"Buck—Boost Converter", From Wikipedia, Retrieved on Apr. 16, 2014, Webpage available at : http://en.wikipedia.org/wiki/Buck%E2%80%93boost_converter.

International Search Report and Written Opinion received for corresponding Patent Cooperation Treaty Application No. PCT/FI2015/050021, dated Apr. 10, 2015, 13 pages.

* cited by examiner

METHODS AND APPARATUS FOR BATTERY CHARACTERISTIC CONVERSION

TECHNICAL FIELD

The present invention relates generally to battery configuration. More particularly, the invention relates to improved systems and techniques for a virtual battery assembly usable with an electronic device and presenting characteristics of the interface to the device that are adapted to the device and transparent to the characteristics of the battery being used with the assembly.

BACKGROUND

Portable electronic devices continue to gain in popularity and manufacturers are constantly seeking to meet the desires of users by increasing the capabilities of such devices. As different devices are developed to have different functionalities, device configurations to have particular sets of functionalities may call for particular power requirements. New battery chemistries are constantly being developed, and these chemistries may result in different power profiles. For example, varying battery chemistries and configurations may produce different output voltages or charging voltages, and different device capabilities may call for different power profiles for better performance.

SUMMARY

In one embodiment of the invention, an apparatus comprises a battery interface, an interface to an electronic device, and a bidirectional voltage ratio converter allowing bidirectional current flow between the battery interface and the electronic device, wherein the bidirectional voltage ratio converter presents energy characteristics at the interface adapted to the electronic device and independent of a battery at the battery interface, and energy characteristics at the battery interface adapted to the battery.

In another embodiment of the invention, a method comprises allowing bidirectional current flow at a bidirectional voltage ratio converter between a battery interface and an electronic device interface and controlling the bidirectional voltage ratio converter to present at the electronic device interface energy characteristics adapted to the electronic device and independent of a battery at the battery interface, and to present at the battery interface energy characteristics adapted to the battery.

In another embodiment of the invention, an apparatus comprises means for allowing bidirectional current flow at a bidirectional voltage ratio converter between a battery interface and an electronic device interface, and means for controlling the bidirectional voltage ratio converter to present at the electronic device interface energy characteristics adapted to the electronic device and independent of a battery at the battery interface, and to present at the battery interface energy characteristics adapted to the battery.

In another embodiment of the invention, a method comprises, upon connection of a virtual cell comprising a battery, a bidirectional voltage ratio converter, and a device interface to an electronic device, sensing voltage and current characteristics of the battery and a device connection, upon determination that comparative voltages at the battery and the device are such that the battery is to power the device, controlling current flow and voltage characteristics such that energy presented at the device interface is adapted to the characteristics of the device, and, upon determination that comparative voltages at the battery and the device are such that the battery is to be charged by the device, controlling current flow and voltage characteristics are controlled such that energy from the device is delivered to the battery, with the energy being adapted to the characteristics of the battery.

In another embodiment of the invention, an apparatus comprises a battery, a bidirectional voltage ratio converter, and an output interface for connection to an electronic device. The bidirectional voltage ratio converter is controlled by a transfer function chosen to control the duty cycle of the battery so as to produce a scaling ratio adapting the characteristics at the output interface to the requirements of the electronic device.

DETAILED DESCRIPTION

Figure 1:
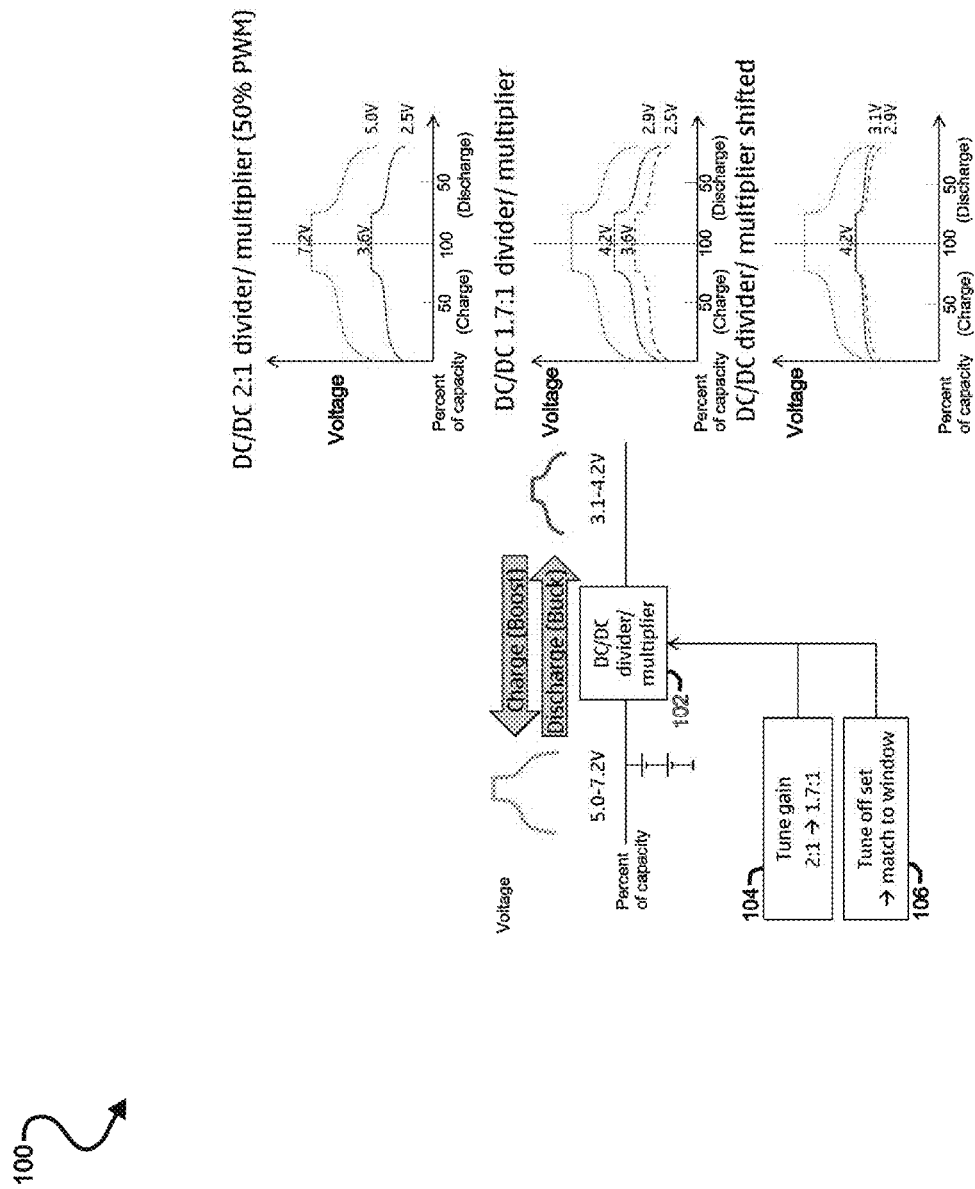
FIG. 1 illustrates a battery characteristic converter according to an embodiment of the present invention.

Embodiments of the present invention address the fact that variation in device power requirements and their combination with variations in such battery properties as voltage and current profiles, charging requirements, and heat dissipation presents a number of challenges. Product families, and the industry in general, may build electric circuits based on favored battery specifications. At the same time, new batteries may be developed that provide beneficial features (for example, increased capacity, improved power, longer life cycle, or lower cutoff voltage, or the use of multiple cells) but which cannot be used to full advantage given the battery interface of a user's device. For example, a new higher capacity battery may come with a higher charging requirement, and such a requirement may be unable to be met by a particular existing device. If a battery is charged by a device that delivers less than the battery's ideal charging voltage, the battery may be charged to less than its full capacity. If advances in batteries call for designs operating at a different voltage than is used by devices, adoption of advanced designs may prove difficult.

In addition, as users switch to newer devices, the batteries of the older devices may still function and may (at least theoretically) be usable as spare batteries for the new devices. A device manufacturer might design devices to share the same battery size and shape and other external characteristics in order to make possible the use of batteries from previously used devices, but changes in power requirements of devices would make older batteries incompatible with newer devices, even if the old batteries could physically fit in the newer devices.

Numerous advantages can be achieved through mechanisms for adapting battery characteristics presented at battery terminals of a device to the requirements or capabilities of the device. In one or more embodiments, therefore, the invention provides for mechanisms for conversion of battery characteristics to those required by or capable of being served by a device to which the battery is connected. A bidirectional synchronous converter is capable of implementing a set of conversion procedures, or a smart procedure, to cause one type of battery to appear and behave as another type of battery, such as a battery with a different chemistry. For example, a high energy battery can appear as a conventional lithium ion ($LiCoO_2$) battery, but with a longer operating time. Mechanisms according to one or more embodiments of the present invention provide for a DC/DC conversion apparatus whose output can deviate from the input. The apparatus can be supplied with an input from a first battery as the battery charge goes from 100% to 0% and the output can follow the characteristics that would appear at a second, different battery as the charge of that battery went from 100% to 0). In addition, the apparatus can receive charging current adapted to the first battery and can deliver the charging current as needed by the second battery. DC/DC converters adapted so that their designed to provide one or more of constant voltage or constant current output, and may include mechanisms such as input tracking to assist soft start or to protect input power supply, maximum power point tracking to maximize the power a DC/DC converter can use from a power supply, heat shut down, and the like.

In one or more embodiments of the invention, a buck/boost converter is operated bidirectionally, supplying or consuming current based on the characteristics presented at its terminals. In this bidirectional operation, a circuit may operate as a buck converter (for example), reducing voltage and supplying greater current to its output than it receives as an input. In addition, if the current direction is reversed, the same circuit can continue operation as a boost converter, boosting voltage and supplying current to the terminals that were previously its input terminals from which it received current.

The output voltage of a buck converter is equal to its input voltage reduced by the pulse ratio—that is, $V_{out}=V_{in}*PW_{ratio}$. For example, with a 50% pulse ratio, the output voltage of a buck converter is half the input voltage, and with a 70% pulse ratio, the output voltage is 70% of the input voltage. In another approach, the pulse ratio used in the discharge cycle and the charging cycle may be constant within each cycle, but different from one another. Power curves can be elevated or flattened to compensate for load and for differences between technologies.

FIG. 1 illustrates functional diagram of a battery characteristic converter 100 according to an embodiment of the present invention. The converter 100 comprises a bidirectional buck/boost converter comprising a DC/DC divider/multiplier 102 controlled by a gain module 104 and an offset module 106. The gain module 104 and the offset module 106 adjust pulse ratio to achieve desired voltage ratio based on the characteristics of the input (such as a battery or charging device) and the desired characteristics of the output (such as a battery output to be emulated or desired charging characteristics of a battery to be charged), in order to adjust the output to the desired level given the available input. In the present example, a higher power battery, with a voltage profile ranging between 5.0 and 7.2 volts is used to power (or to be charged by) a device expecting a voltage profile ranging between 3.1 and 4.2 volts. Profile adjustment is achieved by a combination of gain and offset tuning, with a pulse ratio varying between 2:1 and 1.7:1, and offset being tuned to adjust the output of the division or multiplication to the required range.

The divider/multiplier may be implemented as a synchronous Buck Switch Mode Power Supply (Buck SMPS)/Boost Switch Mode Power Supply (Boost SMPS) (with boost mode being achieved by reverse direction operation). The Buck SMPS/Boost SMPS allows current flow in both directions, and also allows current to be stopped, all the while maintaining the voltage characteristic of the emulated battery. In one embodiment, the divider/multiplier maintains a fixed predefined pulse width, causing the converter interface charge and discharge curves follow a ratio similar to that of the pulse ratio.

Figure 2:
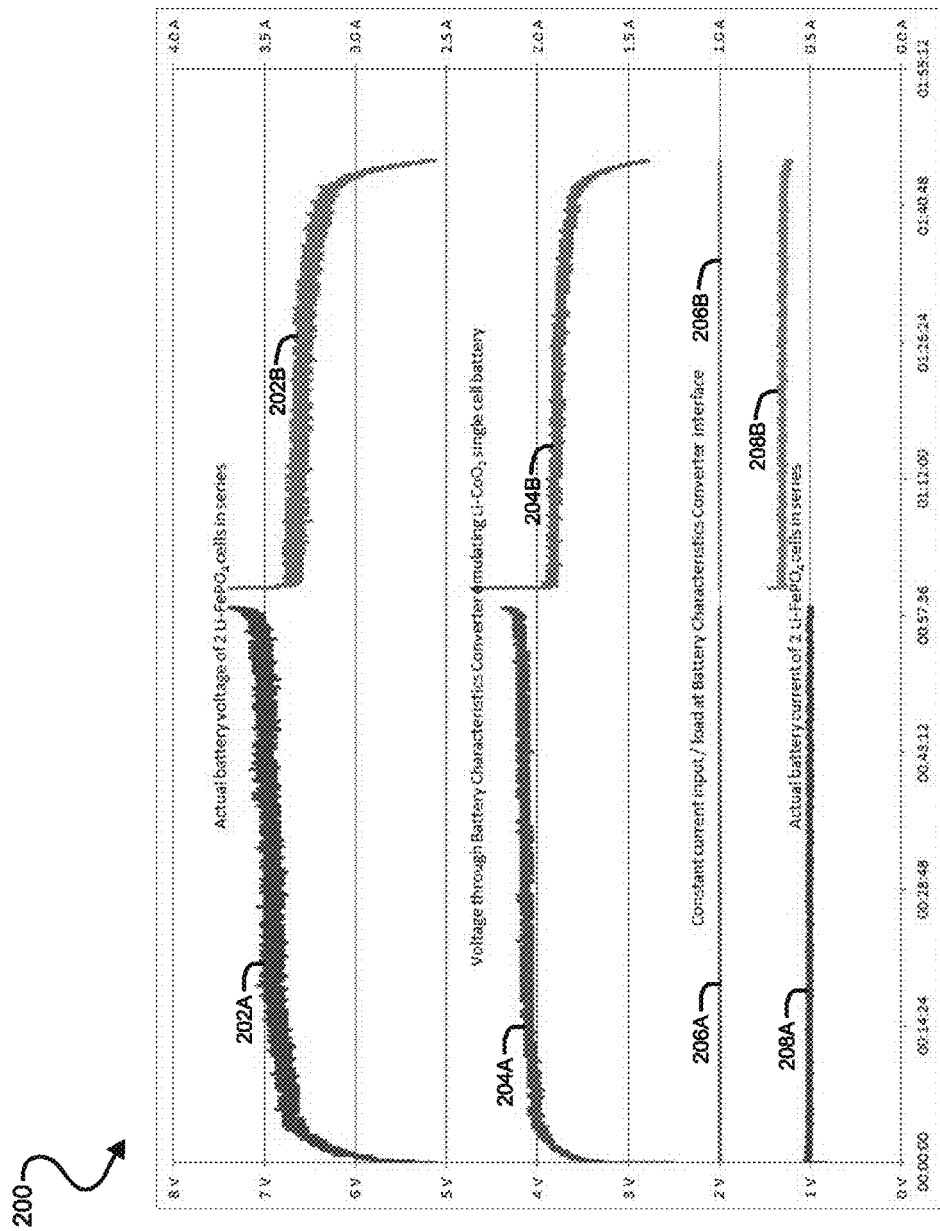
FIG. 2 illustrates a graph illustrating characteristics conversion results of a converter of the present invention.

FIG. 2 illustrates a graph 200, illustrating characteristics conversion results for a converter such as the converter 100. The conversion is from an actual assembly of two Li—$FePO_4$ cells in series, emulating an Li—$CoO_2$ single cell battery. The characteristics displayed enable a 4.2V constant voltage charge for the two 3.6V cells in series. Curves 202A and 202B represent the actual battery voltage, curves 204A and 204B represent the emulated characteristics presented at the converter terminals, curves 206A and 206B represent an emulated constant current/load at the converter interface and curves 208A and 208B represent actual battery current of the in-series cells.

Figure 3:
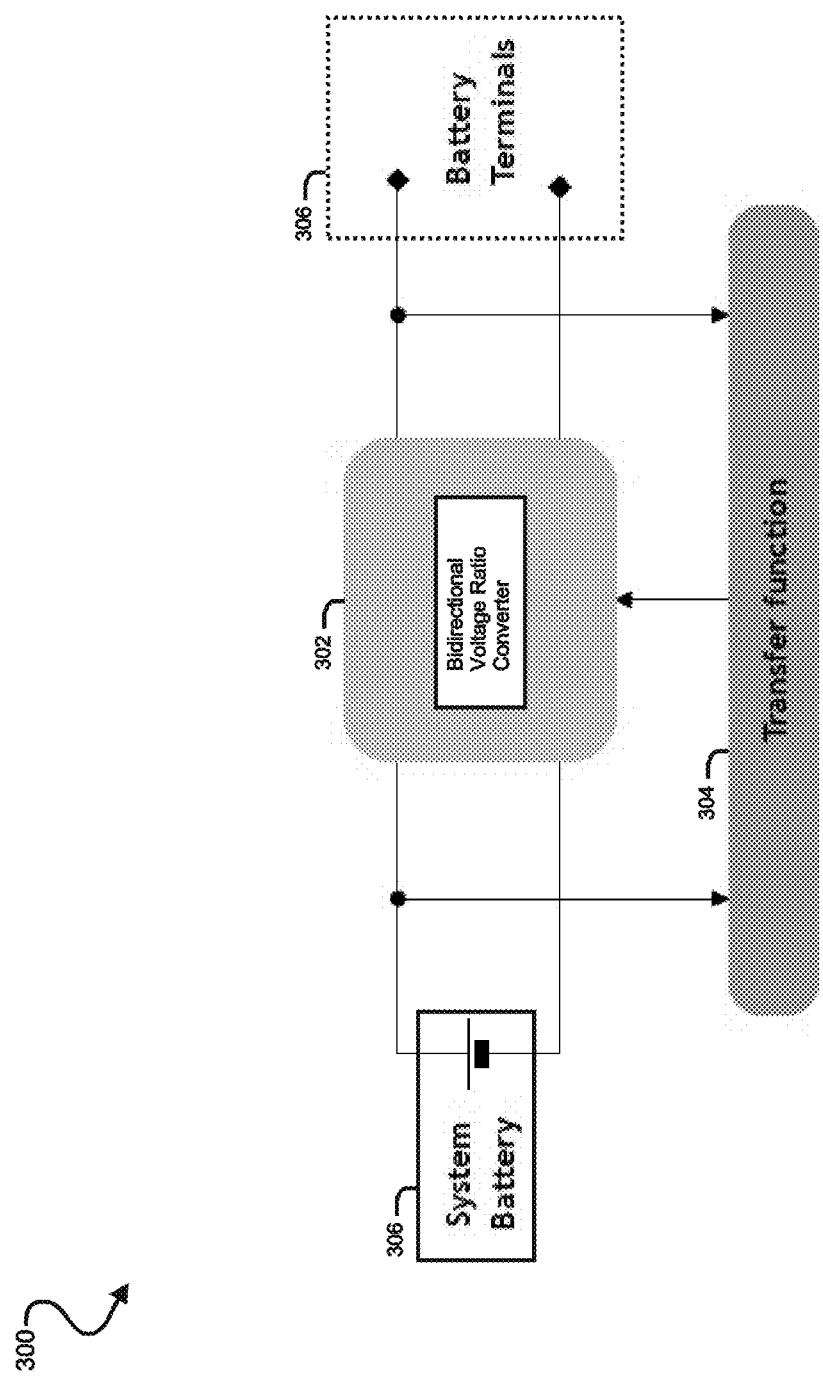
FIGS. 3, 4, and 5 illustrate virtual cells according to embodiments of the present invention.

FIG. 3 illustrates a virtual cell 300, according to an embodiment of the present invention. The converter 300 comprises a bidirectional voltage ratio converter 302, controlled by a transfer function 304, placed between a battery 306 (which may be a multi-cell battery assembly) and battery terminals 308. The transfer function 304 interprets the voltages at the battery 306 and at the battery terminals, as well as (possibly) other parameters such as instantaneous current, cumulative charge transfer, battery equivalent series resistance (ESR) and battery temperature. The transfer function may suitably be designed to give the virtual battery the desired features, allowing, for example:

- fitting charge and discharge curves to a target application (such as management of different battery chemistries) or flattening or linearizing the curve
- modifying the ESR of the battery;
- optimizing the battery voltage level to the target application;
- implementing battery protection functions (such as overvoltage, undervoltage, short circuit, or temperature limit);
- state of charge (SOC) information.

The bidirectional voltage ratio converter 302 may comprise a module having two ports, with each port being able to serve as input or output. The bidirectional voltage ratio converter regulates the voltage at the port that is assigned as output, and the output port assignment may be manual or automatic.

In one frequently occurring use of a virtual cell such as the cell 300, the voltages at the input port and the output port are unequal, and in many cases the output voltage is higher than the input port voltage. Thus, a switching regulator may be used so that upconversion may be performed. The switching regulator may also be used in downconversion, and in one or more embodiments of the invention (as discussed above) buck, boost, or buck/boost converters may be used.

A typical boost converter is a mirror image of a typical buck converter, so that these may be implemented using a single circuit with the mode being automatically defined by the direction of the current.

Figure 4:
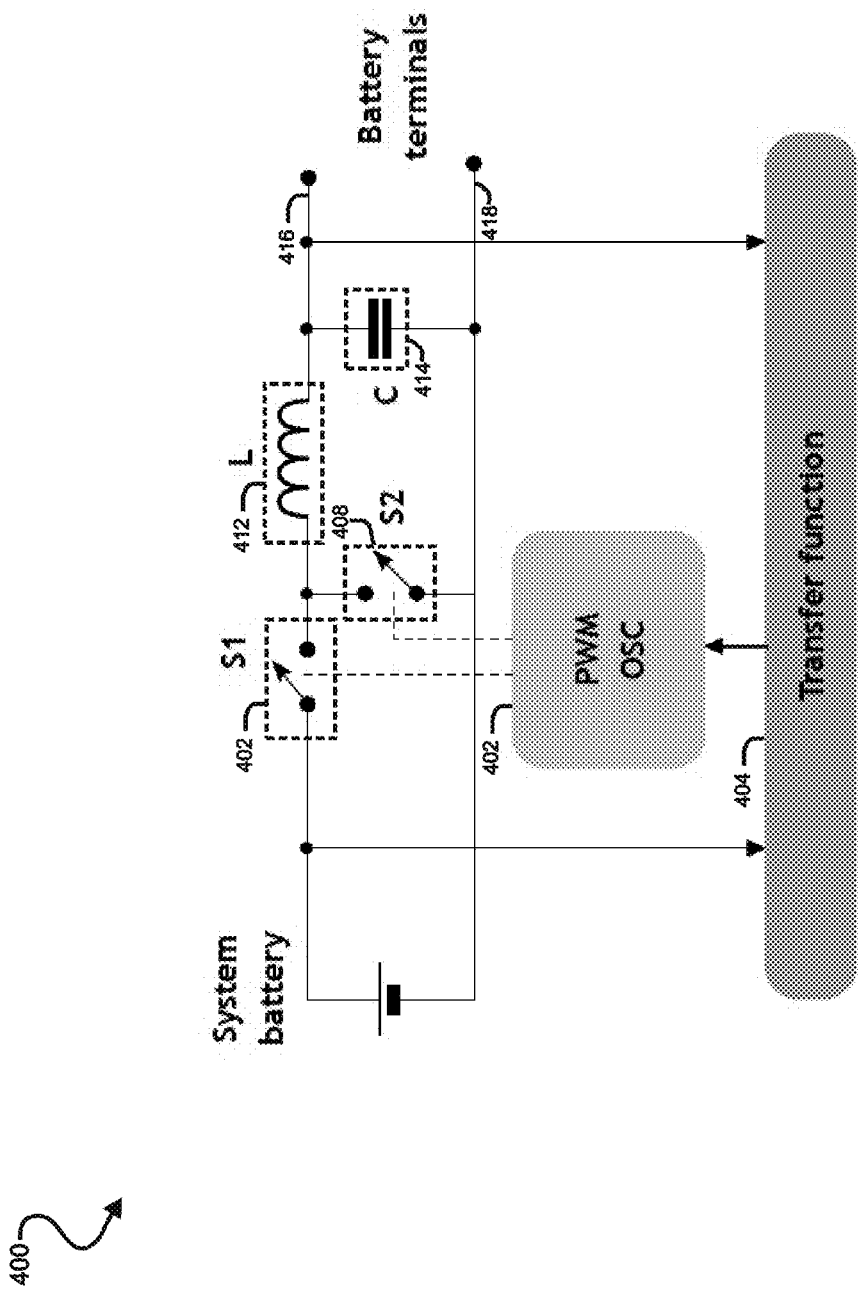

FIG. 4 illustrates a virtual cell 400 in greater detail, showing additional details of a bidirectional voltage ratio converter. The virtual cell 400 comprises a pulse width modulation (PWM) oscillator 402, controlled by a transfer function 404. The PWM oscillator controls first and second switches 406 and 408, which switch current flow between a battery 410, an inductor 412, and a capacitor 414. The capacitor 414 regulates a voltage across output terminals 416 and 418. Energy storage by the indictor 412 and the capacitor 414 depends on current flow, which in turn depends on the settings of the switches 406 and 408. Under the control of the oscillator 402, which is in turn controlled by the transfer function 404, the combination of elements in the virtual cell 400 is able to direct current flow in either direction based on whether voltage is higher at the battery 412 or between the output terminals 416 and 418. The specific voltage level delivered across the output terminals can be managed by selection of the inductor 412 and the capacitor 414 and management of the switches 406 and 408.

Figure 5:
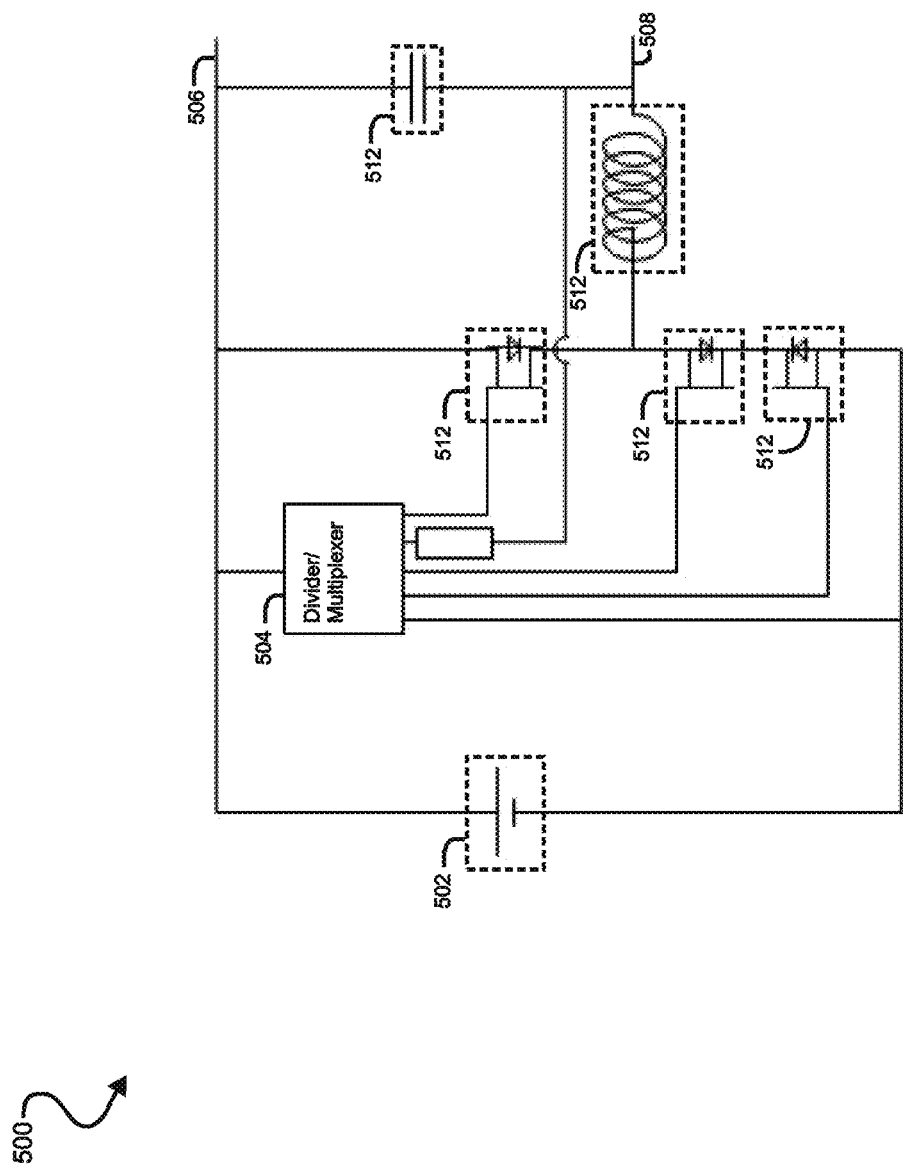

One relatively simple approach to constructing a virtual cell may be a modification of a commonly used battery protection circuit. A lithium ion battery protection circuit may use two metal oxide semiconductor field-effect transistors (MOSFETs), and a relatively minor modification of a typical design of such a battery protection circuit may yield a switch mode power supply (SMPS). FIG. 5, therefore, illustrates a switch mode power supply 500 according to an embodiment of the present invention. The SMPS 500 may comprise a battery 502, divider/multiplexer 504, and output terminals 506 and 508, connected through a capacitor 512. The battery 502 may be connected to the divider/multiplexer 504 and the output terminal 506, and a tap from this connection supplies the output terminal 508 and loops back to the negative terminal of the battery 502.

The divider/multiplexer 504 taps to the output 508 through a resistor 512, and also controls MOSFETs 518, 520, and 522, which act as switches controlling current flow back to the battery, or through a loop including the output terminals and capacitor. The configuration used in the SMPS 500 allows for the use of any desired battery chemistry, with the chemistry being used being transparent to a connected device, with the characteristics of the battery chemistry (such as characteristics of the battery 502) being concealed behind the circuitry of the SMPS 500. The characteristics of the SMPS may be made to appear like those of any desired battery (such as a battery originally used by a device), but with the advantages of any selected battery chemistry.

Transfer functions used in virtual cells, such as the transfer functions 304 and 404, map the cell's input voltage to its output voltage for each direction, depending on the application. Transfer functions may have any of a number of different implementations, ranging from the simplicity of a linear voltage relation to the complexity of a non-linear multi-parameter neural network. An example of a simple transfer function that may be used, a linear relation between input and output, may be used to adapt a 2-cell lithium iron phosphate (LiFePO$_4$) (LFP) battery stack to a single-cell lithium ion application. In the present example, an LFP battery has a 7.2V full battery terminal voltage and a 5.0V cutoff voltage. The lithium ion battery has a 4.2V full battery terminal voltage and a 3.2V cutoff voltage.

Figure 6:
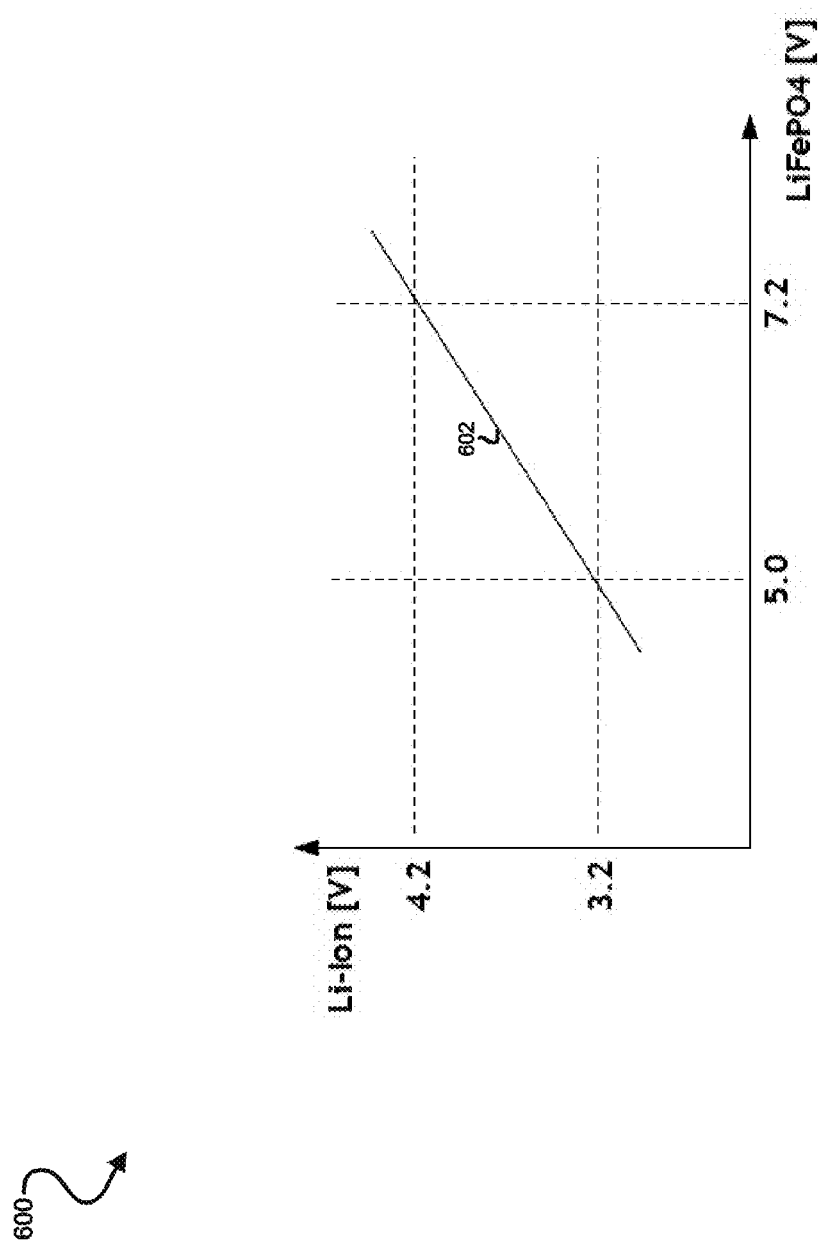
FIG. 6 illustrates a graph of a transfer function according to an embodiment of the present invention.

FIG. 6 presents a graph 600 showing this relationship, with the curve 602 showing the relationship between the two battery types. This relationship may be expressed by:

$$VLI = VLFP/2.2 + 0.93$$

The normalized charge/discharge curves of LiFePO4 and Li-Ion may be unequal, so that the LiFePO4 will not appear as a Li-Ion battery when a linear transfer function is being used. However, the voltage limits are comparable. For an application where the charge state is tracked by (for example) a coulomb counter or similar method, the imprecision of the linear transfer function may be used without introducing significant error. However, if the charge state is determined by measuring the battery voltage, linear transfer function may yield a large error in state of charge estimation.

It will also be noted that the linear transfer function does not alter the effective equivalent series resistance of the battery. The losses in a converter may be compensated with a feedback loop (if the loop gain is high enough), and thus do not add to the ESR.

A typical implementation of a linear transfer function might comprise a combination of hardware elements that together produce the desired transfer function, or might be implemented using data processing elements under the control of software. The specific mechanism used for implementation can be chosen based on factors such as performance requirements, function complexity, and cost. Software implementation is more straightforward and flexible, but is generally slower than hardware implementation, introducing the possibility of stability concerns.

Figure 7:
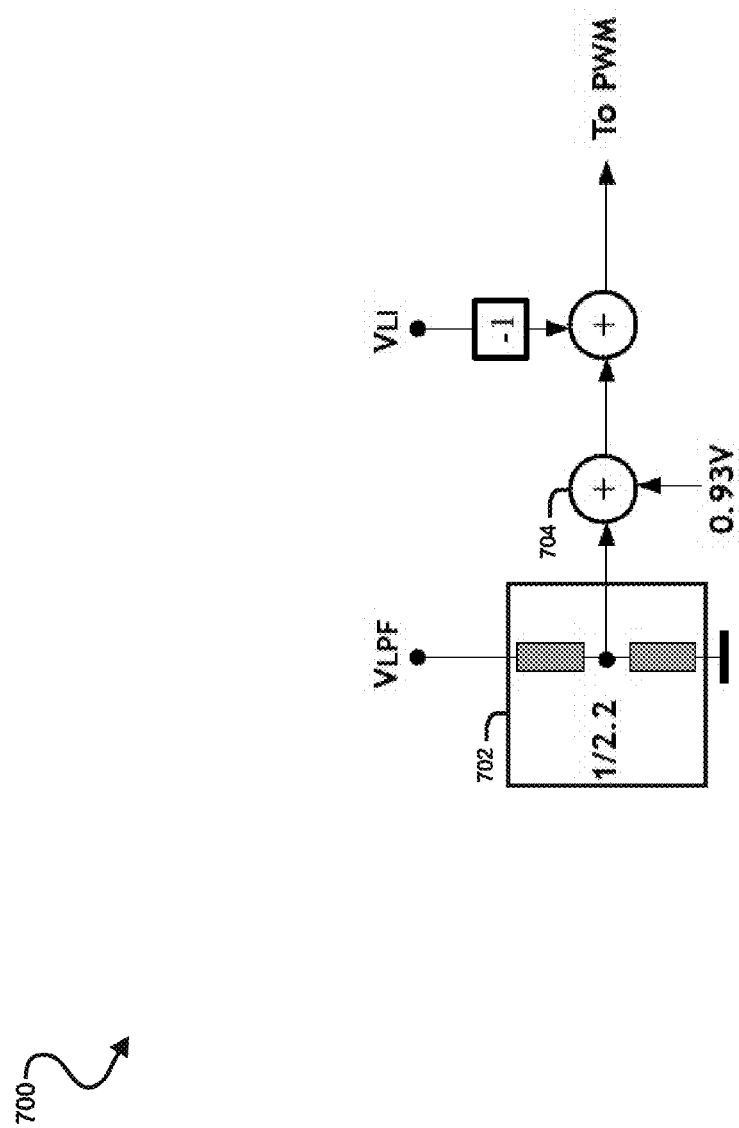
FIG. 7 illustrates a hardware implementation of a transfer function according to an embodiment of the present invention.

FIG. 7 illustrates a hardware implementation 700 of the transfer function discussed above and illustrated by the graph 600 of FIG. 6, comprising a 1/2.2 divider 702, dividing the LiFePO4 battery voltage by 2.2. A summer 704 adds a 0.93V constant to this result. The result of the summation is then compared to the voltage at the virtual battery terminals ($V_{LI}$). The comparison produces an error signal, which is supplied as a steering input to the pulse width modulation (PWM) oscillator. The error signal steers the PWM oscillator's duty cycle in a direction that minimizes the error signal.

In one or more embodiments of the invention, bidirectional switching regulation (such as that achieved by the converter 302 of FIG. 3) may use a single adjustable parameter—the duty cycle of the switch clock. The converter 302 may comprise one or more bidirectional switching regulators. The duty cycle determines the ON time relation between the switches S1 and S2. In one or more embodiments of the invention, the converter may be able to operate in constant current (CC) or constant voltage (CV) mode. This duty cycle adjustment capability provides a convenient mechanism for achieving a virtual battery. The duty cycle defines the scaling ratio between the actual battery voltage and the voltage seen at the battery terminals, because the battery is a constant voltage source or load. For the purpose of scaling ratio adjustment, the battery voltage can be seen as constant even as the battery voltage increases or decreases while the battery charges or discharges, because the rate at which such increase or decrease occurs is too slow to cause duty cycle changes that will result in an inaccurate scaling ratio.

When a device (such as a mobile telephone) uses the battery as a power source, the battery is seen through (for example) a bidirectional switching regulator as a constant voltage source so long as current drawn is less than the maximum safe current level. Drawing the voltage at the regulator's output terminals below the scaling ratio defined by the duty cycle causes the regulator to automatically start to supply current from the battery. When a device attempts to charge the virtual battery, it supplies a constant current source to the regulator's output terminals, causing the voltage to increase above the set scaling ratio. The regulator is thus caused to supply the available current to the battery, charging the battery.

The bidirectional switching regulator's operating mode (buck or boost) and current direction depend on whether the voltage ratio between the regulator ports is higher or lower than the ratio set by the duty cycle of the clock signal. Altering the duty cycle as a function of the voltages at each port dynamically adjusts the virtual battery characteristics.

Embodiments of the present invention address the need to perform conversion efficiently. It will be recognized that a virtual battery will be used to meet the same needs as will a conventional battery, and the need for efficiency is just as great for a virtual battery as for a conventional battery. In cases of full output power, the conversion components should not heat up excessively, and in cases of low output loading, the conversion components themselves should not consume too much power.

Power losses for a switching regulator such as that discussed above result primarily from resistive elements on high current paths and switching losses on clock lines. The resistive losses can be estimated by adding up all the resistive elements on the current paths during one switching cycle.

Figure 8:
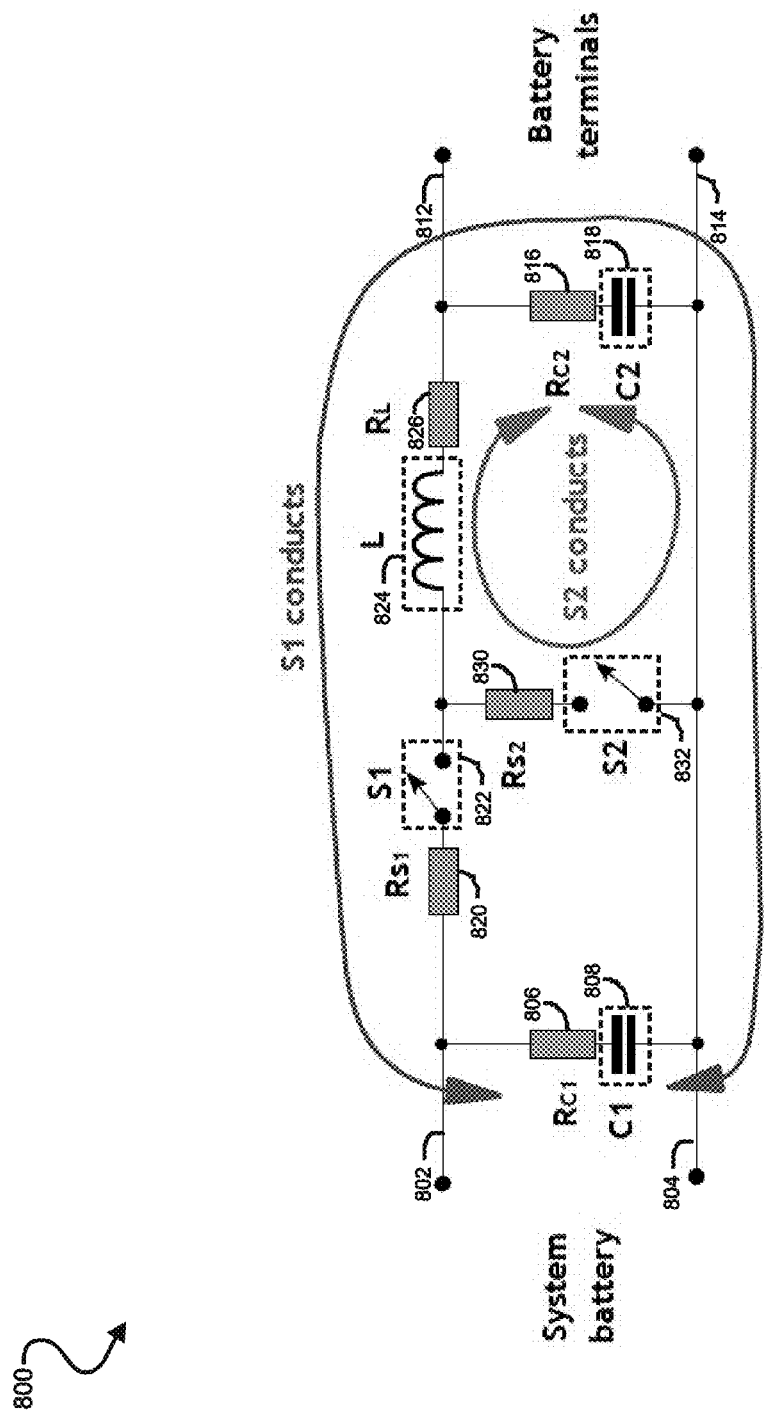
FIG. 8 illustrates a converter according to an embodiment of the present invention.

FIG. 8 illustrates a converter 800, including system battery terminals 802 and 804, connected through a a resistor 806 and a first capacitor 808. The converter 800 further comprises output terminals 812 and 814, connected through a resistor 816 and a second capacitor 818. The converter 800 further comprises a resistor 820, a first switch 822, an inductor 824, and a resistor 826, as well as a resistor 830 and a second switch 832. When the first switch 822 is closed and the second switch 832 is open, the inductor 824 pushes any energy stored to its flux back in the direction of the first capacitor 808. Once all of this stored energy is drained, the inductor 824 begins to draw current from the first capacitor 808 and to charge the second capacitor 818. When the first switch 822 opens and the second switch 832 is closed, the inductor 824 pushes all remaining stored energy to the second capacitor 818 until the flux becomes zero, at which point the inductor 824 begins to draw current from the second capacitor 818.

While the first switch 822 is conducting, losses occur in the resistor 806, the resistor 820, the resistor 826, and the resistor 816, and while the second switch 832 is conducting, losses occur in the resistor 830, the resistor 826, and the resistor 816.

A number of parameters may be managed in order to reduce or minimize losses. Characteristic resistances may be minimized by proper component selection. Selection is usually a tradeoff between losses and component size, cost, and availability. Switching frequency may be increased, reducing the current through capacitors. Inductor inductance may be increased. Pulse skipping or other non-continuous mode operations may be implemented in the case of light loads.

Figure 9:
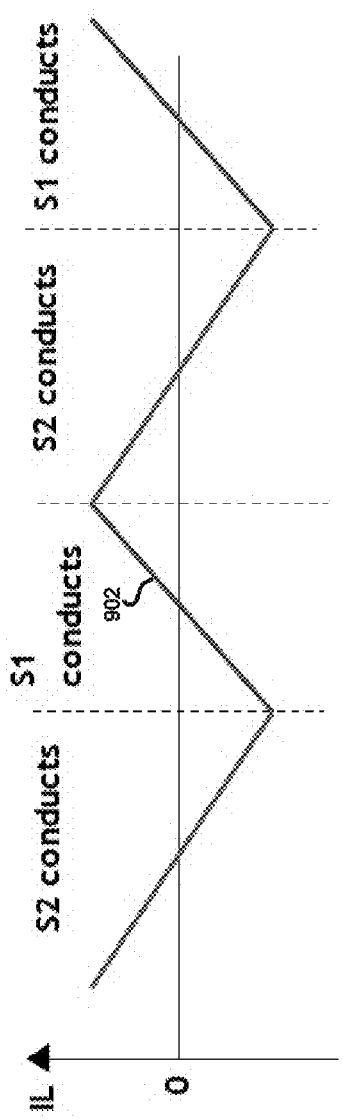
FIG. 9 illustrates a graph of a switching cycle of a converter according to an embodiment of the present invention.

FIG. 9 illustrates a graph 900 showing inductor current flow over a switching cycle without load current, for the converter 800 of FIG. 8. The curve 902 illustrates flow out of and into an inductor 824 with the switch 822 open and the switch 832 closed, and with the switch 832 open and the switch 822 closed. Switching shifts the current flow between the capacitor 808 and the capacitor 818. With every cycle, some loss occurs due to characteristic resistances on the current path.

Figure 10:
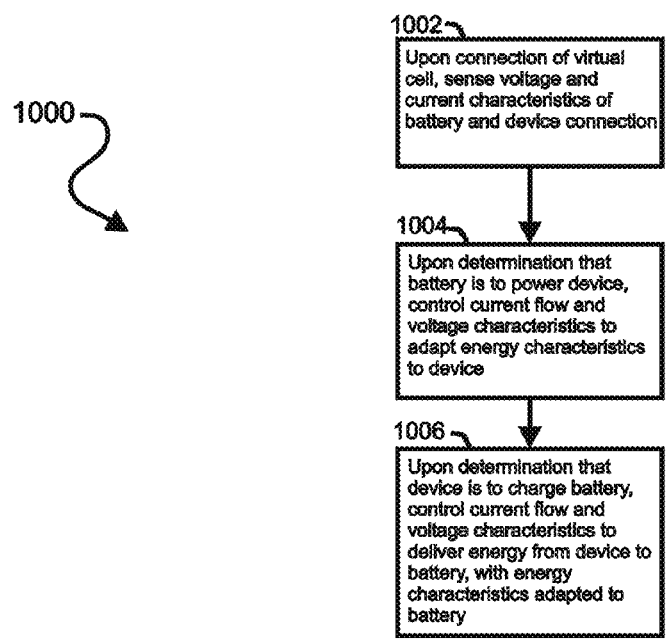
FIG. 10 illustrates a process according to an embodiment of the present invention.

FIG. 10 illustrates a process 1000 according to an embodiment of the present invention. At block 1002, upon connection of a virtual cell comprising a battery, a bidirectional voltage ratio converter, and a device interface to an electronic device, voltage and current characteristics of the battery and a device connection are sensed. At block 1004, upon determination that comparative voltages at the battery and the device are such that the battery is to power the device, current flow and voltage characteristics are controlled such that characteristics at a device interface of the virtual cell to the device are controlled such that energy presented at the device interface is adapted to the characteristics of the device. At block 1006, upon determination that comparative voltages at the battery and the device are such that the battery is to be charged by the device, current flow and voltage characteristics are controlled such that characteristics at a device interface of the virtual cell to the device are controlled such that energy from the device is delivered to the battery. The energy delivered to the battery is adapted to the characteristics of the battery.

While various exemplary embodiments have been described above it should be appreciated that the practice of the invention is not limited to the exemplary embodiments shown and discussed here. Various modifications and adaptations to the foregoing exemplary embodiments of this invention may become apparent to those skilled in the relevant arts in view of the foregoing description.

Further, some of the various features of the above non-limiting embodiments may be used to advantage without the corresponding use of other described features.

The foregoing description should therefore be considered as merely illustrative of the principles, teachings and exemplary embodiments of this invention, and not in limitation thereof.

We claim:

1. An apparatus, comprising:
   a battery interface;
   an interface to an electronic device; and
   a bidirectional voltage ratio converter configured to provide a bidirectional current flow between the battery interface and the electronic device, wherein the bidirectional voltage ratio converter comprises a pulse wide modulation oscillator, wherein the pulse wide modulation oscillator includes a divider and/or multiplexer and one or more switches comprising metal oxide semiconductor field effect transistors, and wherein the bidirectional voltage ratio converter is configured to provide the bidirectional current flow by at least:
   adapting a first energy received at the battery interface to an energy having at least a first energy characteristic adapted to the electronic device; and
   adapting a second energy received at the interface to an energy having at least a second energy characteristic adapted to a battery at the battery interface.

2. The apparatus of claim 1, wherein the bidirectional voltage ratio converter adapts a duty cycle of the apparatus to adjust a scaling ratio between energy characteristics at the interface to the electronic device and the battery interface.

3. The apparatus of claim 1, wherein the pulse width modulation oscillator is controlled by a transfer function.

4. The apparatus of claim 3, wherein the pulse width modulation oscillator further comprises one or more energy storage elements, and wherein the one or more switches are controlled so as to control energy flow to and from the one or more energy storage elements based on the transfer function.

5. The apparatus of claim 1, wherein the apparatus is a modified battery protection circuit.

6. The apparatus of claim 1, wherein the apparatus is configured so as to minimize power losses through resistive loads on high current lines and switching losses on clock lines.

7. The apparatus of claim 1, wherein the bidirectional voltage ratio converter is configured to present energy characteristics at the interface and independent of the battery at the battery interface, energy characteristics at the battery interface.

8. A method comprising:
- upon connection of a virtual cell comprising a battery, a bidirectional voltage ratio converter, and a device interface to an electronic device, sensing voltage and current characteristics of the battery and a device connection, wherein the bidirectional voltage ratio converter comprises a pulse wide modulation oscillator, and wherein the pulse wide modulation oscillator includes a divider and/or multiplexer and one or more switches comprising metal oxide semiconductor field effect transistors;
- upon determination that comparative voltages at the battery and the device are such that the battery is to power the device, using the bidirectional voltage ratio converter to control current flow and voltage characteristics such that energy presented at the device interface is adapted to the characteristics of the device; and
- upon determination that comparative voltages at the battery and the device are such that the battery is to be charged by the device, using the bidirectional voltage ratio converter to control current flow and voltage characteristics such that energy from the device is adapted to the characteristics of the battery.

9. The method of claim 8, wherein the bidirectional voltage ratio converter adapts a duty cycle of the apparatus to adjust a scaling ratio between current flow and voltage characteristics at the device interface and the battery.

10. The method of claim 8, wherein the pulse width modulation oscillator is controlled by a transfer function.

11. The method of claim 10, wherein the pulse width modulation oscillator further comprises one or more energy storage elements, and wherein the one or more switches are controlled so as to control energy flow to and from the one or more energy storage elements based on the transfer function.

12. The method of claim 8, wherein the apparatus is a modified battery protection circuit.

13. The method of claim 8, wherein the apparatus is configured so as to minimize power losses through resistive loads on high current lines and switching losses on clock lines.

14. An apparatus comprising:
- a battery;
- a bidirectional voltage ratio converter; and
- an output interface for connection to an electronic device;
- wherein the bidirectional voltage ratio converter comprises a pulse wide modulation oscillator, wherein the pulse wide modulation oscillator includes a divider and/or multiplexer and one or more switches comprising metal oxide semiconductor field effect transistors, and wherein the bidirectional voltage ratio converter is configured to:
  - adapt a first energy received from the battery to an energy having at least a first energy characteristic adapted to the electronic device; and
  - adapt a second energy received at the output interface to an energy having at least a second energy characteristic adapted to the battery.

15. The apparatus of claim 14, wherein the bidirectional voltage ratio converter comprises a switching regulator configured to perform upconversion and downconversion.

* * * * *